United States Patent [19]

Pizzuti et al.

[11] 4,044,365
[45] Aug. 23, 1977

[54] HANDLE CONSTRUCTION FOR SELF-DEVELOPING CAMERAS

[75] Inventors: Donato F. Pizzuti, Saugus; James K. Skurski, Beverly, both of Mass.

[73] Assignee: Polaroid Corporation, Cambridge, Mass.

[21] Appl. No.: 719,841

[22] Filed: Sept. 2, 1976

[51] Int. Cl.² ............................................. G03B 17/50
[52] U.S. Cl. ...................................... 354/85; 354/82; 354/288; 354/293
[58] Field of Search .................................. 354/82-86, 354/288, 293

[56] References Cited

U.S. PATENT DOCUMENTS

| | | | |
|---|---|---|---|
| 3,522,766 | 8/1970 | Wolbarst | 354/85 |
| 3,678,832 | 7/1972 | Dietz et al. | 354/85 X |

*Primary Examiner*—John Gonzales
*Attorney, Agent, or Firm*—David R. Thornton

[57] ABSTRACT

A folding handle for photographic cameras of the type in which a film sheet assembly is withdrawn manually from the camera housing to effect spreading of processing fluid over the area of the sheet material during such withdrawal. The handle is connected to the camera housing on the end thereof opposite from the end at which the film is withdrawn in a manner to partially restrain relative rotational movement of the handle and the camera housing along the axis of film withdrawal but to allow freedom of rotation between the handle and the housing on all other axes. The handle is provided with a rectangular bail and is foldable to the recessed position in the camera housing during periods of nonuse.

26 Claims, 7 Drawing Figures

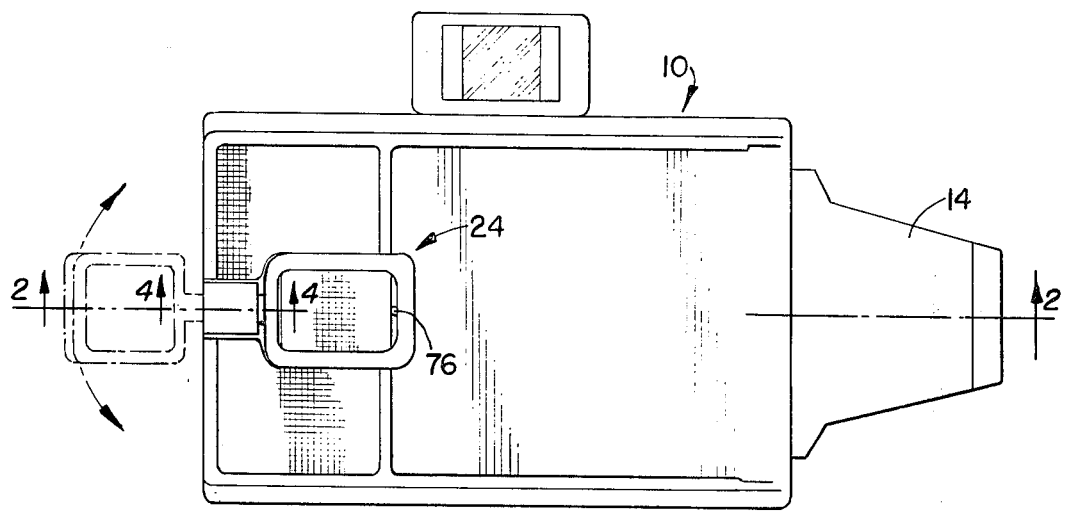
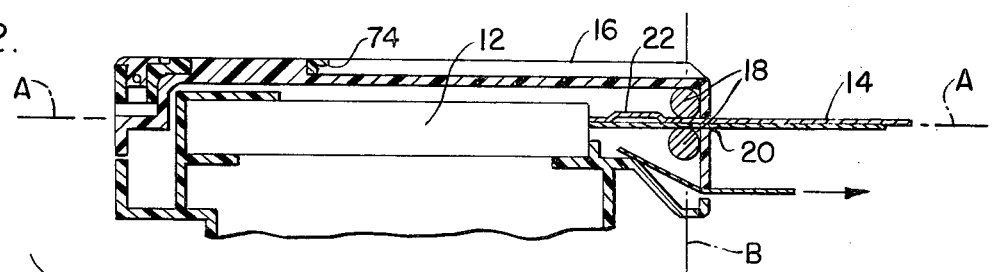
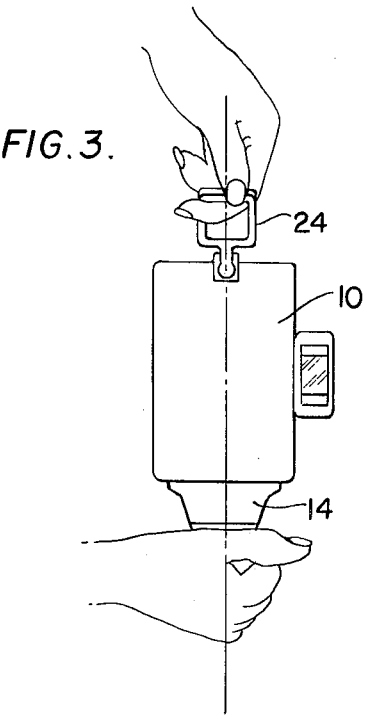
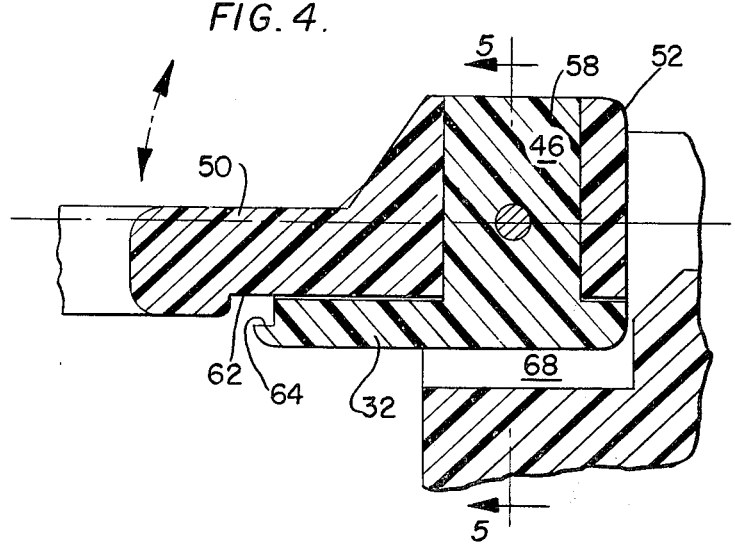

HANDLE CONSTRUCTION FOR SELF-DEVELOPING CAMERAS

BACKGROUND OF THE INVENTION

This invention relates to improvements in self-developing cameras and more particularly, to an improved handle construction for facilitating alignment of hand-held photographic cameras during processing by manual extraction of exposed film sheets from such cameras.

In U.S. Pat. Nos. 3,522,766 and 3,678,832, issued respectively on Aug. 4, 1970 to John Wolbarst and on July 25, 1972 to Milton S. Dietz and Frederick M. Finnemore, both commonly assigned with the present application, self-developing camera systems are disclosed in which a handle connected to one end of a camera housing facilitates orientation of the housing in relation to the direction of film sheet extraction through an opening at the other end of the housing. In the latter of these patents, the handle structure is designed to restrict or preclude rotation of the camera housing relative to the handle but to permit other relative rotational freedom so that film sheet passage through a transverse pressure gap at the opening will be the result solely of tension applied in the longitudinal direction of film sheet withdrawal. The pressure gap, conventionally provided by a pinch roller pair or by a pair of oppositely biased bars, functions in a well-known manner to rupture a film sheet carried processing fluid pod and to spread the fluid uniformly over the film sheet as the latter is drawn through the gap. Because of the relative rotational freedom between the handle and the housing on all axes in a plane normal to the direction of film sheet removal, it is difficult, if not impossible; for an operator using the handle to stress the film at the pressure gap in a manner to cause non-uniform or incomplete spreading of the processing fluid. Moreover, the transmission of torque between the handle and the camera housing along the axis of film sheet withdrawal tends to prevent unwanted oscillation of the camera body around an axis parallel to the direction of the film sheet removal.

Although the system disclosed in last issued of the aforementioned patents has been demonstrated through extensive commercial use to be extremely effective in the avoidance of faulty film processing in self-developing cameras, there is need for improvement particularly from the standpoint of cost reduction as well as space reduction at least when the camera is not in use. In this latter respect, the handle of the prior system projected as a longitudinal extension at the end of the camera body as an incident to proper operation and also in some measure as a conspicuous reminder that it should be used during the withdrawal of the exposed film sheet from the other end of the housing. While admirably suited to these ends, the overall cmpactness of the camera was compromised.

SUMMARY OF THE PRESENT INVENTION

In accordance with the present invention, the functional advantages of the camera system of the aforementioned patent are retained by a simple and thus inexpensive handle structure capable of being folded to a retracted position in which the handle is clearly visible on the exterior of the camera housing and readily extended to a position of use for processing withdrawal of an exposed film sheet from the camera. The improved handle assembly features a molded, one-piece pivot block receivable in a camera housing recess for pivotal motion on a first transverse axis normal to the longitudinal axis of film sheet removal and supporting an integral pintle pivotal in a bearing aperture on a boss formation of a onepiece handle component to permit pivotal or rotational movement of the handle component on a second transverse axis intersecting and normal to the first transverse axis. The handle is preferably formed of material having a flexure modulus allowing a measure of torsional strain on a third or longitudinal axis orthoganal to the other axes. Rotation on the longitudinal axis is therefore partially restrained, to provide a measure of stability on this axis. A single pin effects both retention of the assembled pivot block and handle component with each other and within the recess of the camera housing. The pivot block also functions as a protective and esthetic cover for the relatively movable surface portions of the assembly when the handle is folded to a retracted position lying within the exterior surface planes of the camera housing.

Among the objects of the present invention are therefore: the provision of an improved handle attachment for facilitating processing withdrawal of film sheets from handheld self-developing cameras; the provision of such a handle which is readily accessible from the exterior of the camera housing and yet foldable to an out-of-the-way retracted or recessed position contributing to overall compactness of the camera housing; the provision of such a handle structure capable of manufacture from a minimal number of molded plastic parts; the provision of such a handle structure by which the material strength of component parts is optimized in the overall assembly to provide a rugged, high-strength handle construction; and the provision of such a handle structure in which the point of pivot axis intersection is located at or very close to the longitudinal axis of film sheet withdrawal from the camera housing.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 1 is a rear elevation of a self-developing camera incorporating the improved handle structure of the present invention;

FIG. 2 is a longitudinal cross-section on line 2—2 of FIG. 1;

FIG. 3 is a view similar to FIG. 1 but illustrating use of the handle of the invention during manual processing extraction of a film strip from the camera housing to which it is attached;

FIG. 4 is an enlarged fragmentary cross-section on line 4—4 of FIG. 1;

DETAILED DESCRIPTION OF THE PREFERRED EMBODIMENT

Figure 5:
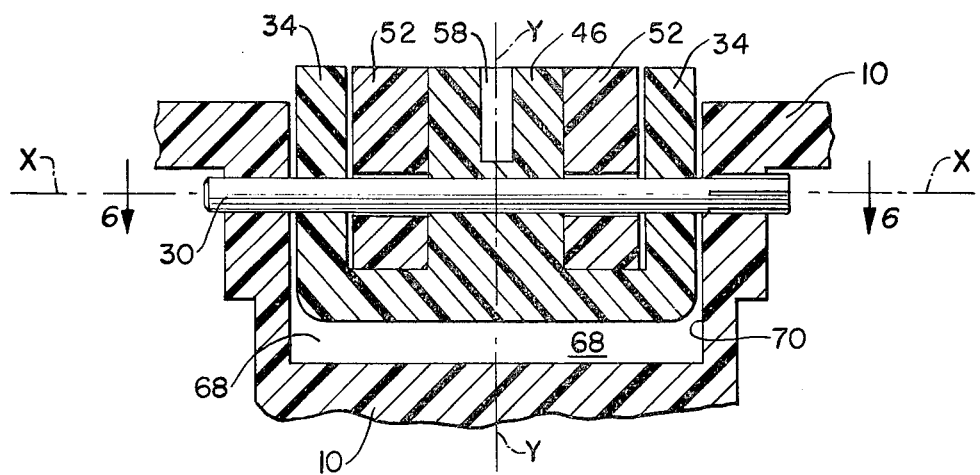
FIG. 5 is a fragmentary cross-section on line 5—5 of FIG. 4.

In FIGS. 1–3 of the drawings, the film housing of a self-developing camera is generally designated by the reference numeral 10 and shown to contain a film pack 12 positioned such that individual film sheet assemblies 14 may be exposed through an objective lens (not shown) in a manner well known in the art. The film pack 12 is typically loaded in the housing 10 by opening a hinged cover 16 forming the rear wall of the housing. As shown in FIG. 2, such self-developing cameras may include a pair of pinch rollers 18 positioned within the housing adjacent an opening 20 at one end thereof. The pinch rollers 18 define a gap in alignment with the opening 20 and through which the film sheets are withdrawn after exposure in a manner to cause a rupture of a processing fluid pod 22 carried by the film sheet assembly 14 and subsequent spreading of the fluid over the area of the film sheet. As illustrated in the aforementioned U.S. Patents, the pressure gap established by the pinch roller pair 18 may be also provided by a pair of biased pressure bars. In either case, it is important that the direction of film withdrawal parallel as closely as possible a longitudinal axis A passing through the opening 20 and perpendicular to a plane B containing the axes of the pinch roller pair. To facilitate such withdrawal of the film manually, the housing is provided on the end thereof opposite from the opening 20 with a handle assembly designated generally by the reference numeral 24 and to be described in detail below.

As may be seen by reference to FIG. 4–7 of the drawings, the handle 24 is a three-part assembly including a pivot block 26, a handle body 28, and a pin 30. The pivot block is a one-piece molding preferably of a polycarbonate resin available commercially under the tradename designation "Lexan 141." Such material exhibits a flexure modulus of approximately 400,000 pounds per square inch. As shown, the pivot block is formed with a plate or web portion 32 of rectangular configuration and having a pair of integral side lug formations 34. Each of the side lugs 34 is of identical complementary configuration to provide planar and mutually perpendicular side, rear, and end faces, 36, 38 and 40, respectively. The front faces 42 of the lug formations 34 diverge forwardly with respect to each other as may be seen most clearly in FIGS. 6 and 7. The inner faces 44 of the lug formations 34 lie on a common cylinder having an axis $y$ and thus are concentric with a central pintle formation 46 projecting from the web portion 32.

The handle body 28 is also a one-piece molding of a plastic material having a flexure modulus on the order of 50,000 pounds per square inch or about one-eighth that of the pivot block 26. An exemplary material for the handle body 28 is a polyester resin commercially available under the name "Hytrel." The handle body has a generally rectangular bail portion 48 joined by a shank portion 50 with a pivot boss portion 52. The pivot boss 52 is provided with a pair of cylindrical side surfaces 54 of common radii and concentric with a bearing aperture 56 on the axis $y$. As shown in FIGS. 4 and 5 the bearing aperture 56 is of a size to receive the pintle 46 with minimal clearance, the pintle having an axial slot 58 to provide a measure of resiliency by which the pintle will fit snugly into the bearing aperture 56. The radii of the cylindrical surfaces 54 on the boss portion 52 are slightly less than the radii of the internal lug surfaces 44 so that these surfaces will fit within each other with a slight clearance (see FIG. 5).

As shown in FIGS. 4 and 5, the depth of the boss portion 52 along the axis $y$ is essentially the same as the length of the pintle 46 and lug formations 36 so that the end faces 40 of the lug formations will be flush with the corresponding surface on the boss portion 52. Similarly, the projecting end portion of the boss 52 is provided with a planar surface 60 which is oriented to lie flush with the rear faces 38 of the lug formations. Also it will be noted in FIG. 4 that a surface 62 of the handle shank portion 50 lies against the web portion 32 of the pivot block 26. The web portion is provided with a step 64 delimited by a curve 66 to accommodate pivotal movement of the handle 28 on the axis $y$.

To facilitate connection of the handle assembly 24 to the housing 10 in a manner permitting movement thereof between a retracted or recessed position shown in solid lines in FIG. 1 to an extended operative position depicted by phantom lines in FIG. 1, the cover 16 of the housing 10 is provided at the end thereof opposite the opening 20 with a handle mounting well 68 defined in part by a pair of integral side walls 70 projecting outwardly to the end face of the cover and inwardly merging with a handle recess 72 of a profile to complement the handle bail 48. As shown in FIGS. 1 and 2, the bail 48 lies with the recess 72 and projects at its end as a lip 74 to facilitate manual engagement thereof. A projecting detent 76 is provided in the cover 16 to retain the handle in the retracted or recessed position depicted by the solid line illustration of FIGS. 1 and 2.

Figure 6:
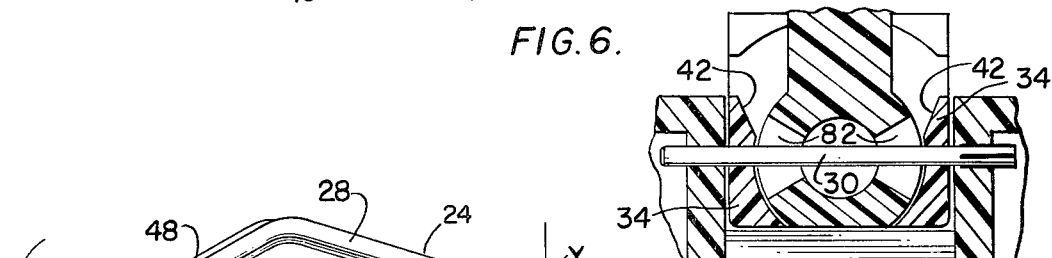
FIG. 6 is a fragmentary cross-section on line 6—6 of FIG. 5.
Figure 7:
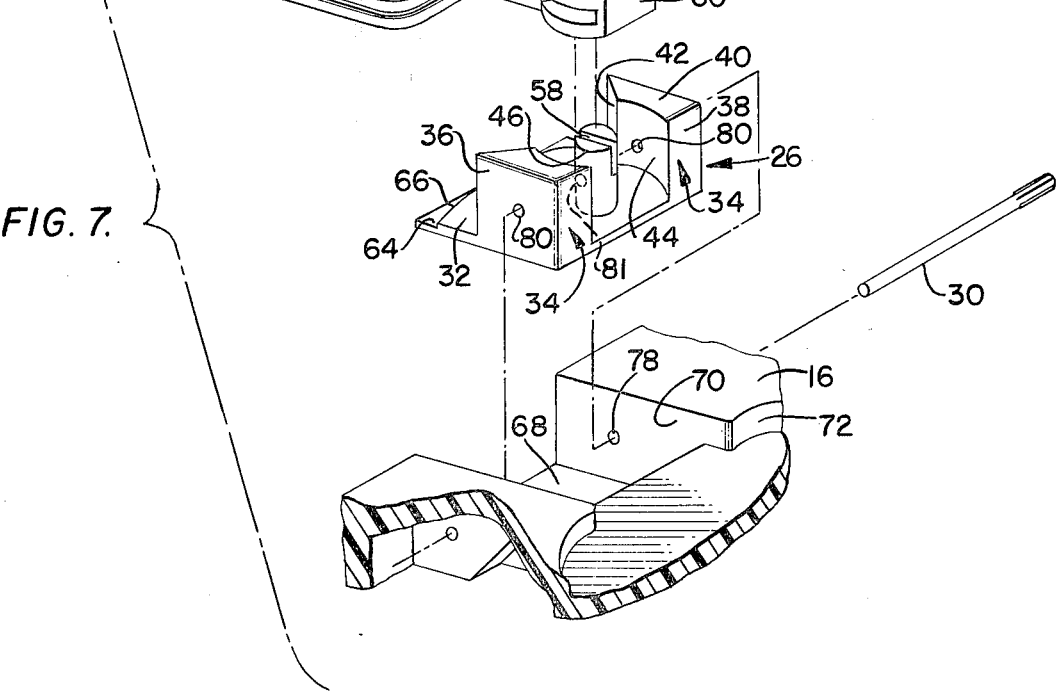
FIG. 7 is an exploded perspective view illustrating the components of the handle of the invention.

The spacing between the walls 70 of the well 68 is slightly greater than the spacing between the side faces 36 on the pivot block 26 to provide a slight clearance as shown, for example, in FIGS. 5 and 6 of the drawings. Also, the other dimensions of the pivot block 26 with respect to the well 68 facilitate pivotal movement of the block about an axis $x$. The location of the axis $x$ with respect to the housing 10 is established by the pin 30 which projects through aligned apertures 78 in the side wall 70 of the well 68 as well as through apertures 80 in the pivot block and through an aperture 81 in the pintle to secure the pivot block on the axis $x$. Also, in this respect, it will be noted that the boss portion 52 of the handle 28 is provided with a pair of segment slots 82 through which the pin 30 extends. The slots 82 enable the pin to secure the assembly of the handle 28 with the pivot block 26 and the housing 10 without restricting pivotal movement of the handle about the axis $y$ and within the limits of the segment slots.

Use of the handle assembly 24 for processing withdrawal of the film sheet 14 from the housing 10 will be apparent from the illustration of FIGS. 1–3. In particular, the handle body 28 is lifted and pivoted from its recessed position shown in FIG. 2 to be grasped by one hand while the film sheet 14 is withdrawn along the axis A through the opening 20 and the gap between the pinch roller pair 18. Because of the permitted pivotal freedom about both axes $x$ and $y$ in the connection of the handle to the camera housing, tension will be applied to the film in a direction confined in parallelism with the longitudinal axis A of the housing 10. Also in the respect, it is to be noted that because of the recessed location of the pin 30 in the well 68, the point of intersection of the perpendicular pivotal axes $x$ and $y$ lies sufficiently close to the plane of the film sheet at the intersection thereof with the plane B in the compression gap established by the pinch roller pair 18 that the sheet will be maintained perpendicular to the plane B throughout withdrawal thereof past the pressure gap. Moreover, any tendency for angular movement of the sheet in the plane thereof will be accommodated by pivotal movement of the handle of the axis $y$.

In addition to free relative pivotal motion on the axes $x$ and $y$, an adequate measure of torsional flexure will occur in the handle body 28, principally in the shank portion 50 thereof, to avoid any possibility of scalping the film sheet 14 or pulling it against the side edges of the opening 20. Yet, sufficient pliability or partial restraint against relative rotation on the longitudinal axis A is available to provide control of camera oscillation on that axis.

Thus is will be seen that by this invention there is provided an improved handle assembly for manually operated self-developing cameras and by which the above-mentioned objectives are completely fulfilled. Also, it will be apparent to those skilled in the art from the preceding description that modifications and/or changes may be made in the disclosed embodiment without departure from the inventive concept manifested thereby. Accordingly, it is expressly intended that the foregoing description is illustrative of a preferred embodiment only, not limiting, and that the true spirit and scope of the present invention be determined by reference to the appended claims.

We claim:

1. In a self-developing camera having a housing to receive photographic sheet material and a means for spreading a processing fluid over such sheet material as same is withdrawn from an opening at one end of the housing, a handle located at the other end of the housing and connected thereto at a point spaced from the opening and positioned close to a longitudinal axis of the housing passing through the opening, such handle permitting rotational freedom of said housing relative to the handle on axis perpendicular to such longitudinal axis the improvement comprising:
   means defining a handle recess in the housing; and
   means mounting the handle for movement to a recessed position within said handle recess.

2. The improvement as described in claim 1 wherein the handle includes handle body having a generally rectangular bail portion.

3. The improvement as described in claim 2 wherein said handle is formed of a material having a low flexure modulus to permit yieldable rotation between the handle and the housing on the longitudinal axis thereof.

4. The improvement as described in claim 2 wherein said handle recess includes means for releasably retaining said handle body in the recessed position with said handle recess.

5. The improvement as described in claim 4 wherein said means for releasably retaining said handle body in the recessed position comprises a projecting detent to engage said bail portion.

6. The improvement as described in claim 1 wherein the connection of the handle to the housing includes pin means defining a first pivotal axis for the handle.

7. The improvement as described in claim 6 comprising means defining a pair of spaced side walls in the housing, and wherein said pin means extends through said side walls.

8. The improvement as described in claim 7 wherein said spaced side walls lie in planes generally parallel to the longitudinal axis of the housing.

9. The improvement as described in claim 6 comprising means for pivoting the handle on a second axis perpendicular to said first axis.

10. The improvement as described in claim 9 wherein said means for pivoting the handle on said second axis comprises a pintle supported by said pin means and boss means on the handle defining a bearing aperture to receive said pintle.

11. The improvement as described in claim 10 wherein said second axis intersects said first axis.

12. The improvement as described in claim 10 comprising a pivot block for supporting said pintle from said pin means, said pivot block having a plate portion parallel to and displaced from said first axis and a pair of lug formations defining an annular recess portion with said pintle and concentric with said second axis, said boss means having cylindrical surface portions receivable in said annular recess portion.

13. The improvement as described in claim 12 wherein said pin means extends through said lug formations, said boss portion and said pintle, said boss portion having segment slots to permit pivotal movement thereof on said pintle and relative to said pin menas.

14. In a self-developing camera having a housing to receive photographic sheet material, means for spreading a processing fluid over such sheet material as same is withdrawn from an opening at one end of the housing, and a handle located at the other end of the housing and connected thereto at a point spaced from the opening and positioned close to a longitudinal axis of the housing passing through the opening, such handle permitting rotational freedom of the housing relative to said handle on axes perpendicular to such longitudinal axis, the improvement comprising
   means defining a handle mounting well in the housing having a pair of spaced side walls lying in planes generally parallel to the longitudinal housing axis;
   a pivot block positioned in said well for pivotal movement about a first transverse axis normal to the longitudinal housing axis, said pivot block having pintle means on a second transverse axis normal to and intersecting said first transverse axis;
   a mounting boss on the handle having a bearing aperture received on said pintle, said boss having a pair of segmentshaped slots opening to said bearing aperture; and
   pin means extending through said side walls, said pivot block, and said segment slots in said handle boss on said first transverse axis.

15. The improvement recited in claim 14 comprising means defining a handle recess in the housing, the handle being movable to a retracted position within said handle recess.

16. The improvement recited in claim 15 wherein said handle recess includes means for releasably retaining said handle in said retracted position.

17. The improvement recited in claim 14 wherein the handle includes a generally rectangular bail portion.

18. The improvement recited in claim 17 wherein said pivot block and said handle respectively, are integral moldings of plastic material.

19. The improvement recited in claim 18 wherein said pintle is formed having an axial slot to provide for resilient bearing engagement thereof in said bearing aperture.

20. The improvement recited in claim 15 wherein said pivot block includes a plate portion integrally supporting said pintle means, said plate portion having a surface on the side thereof opposite from said pintle to provide a flush continuation of the camera housing when said handle is in said retracted position.

21. The improvement recited in claim 14 wherein said pivot block is formed of a material having a relatively high modulus of flexure and said handle is formed of a material having a relatively low flexure modulus.

22. The improvement recited in claim 21 wherein the flexure modulus of said pivot block material is on the order of 8 times that of said handle.

23. The improvement recited in claim 22 wherein the flexure modulus of said pivot block is on the order of 400,000 pounds per square inch and the flexure modulus of said handle is on the order of 50,000 pounds per square inch.

24. The improvement recited in claim 21 wherein said pivot block is an integral molding of a polycarbonate resin having a flexure modulus on the order of 400,000 pounds per square inch and wherein said handle is an integral molding of a polyester resin having a flexure modulus on the order of 50,000 pounds per square inch.

25. Holding means for facilitating alignment of a hand-held photographic camera during manual processing withdrawal of photographic film material from the apparatus, said holding means comprising:

a handle body having a generally rectangular bail;

a shank portion joined at one end to said body and having a mounting boss at the other end thereof, said boss defining a cylindrical bearing aperture and having a pair of segment slots extending from the outer side surfaces thereof into said bearing aperture in a plane normal to and intersecting the axis of said bearing aperture;

a pivot block having a plate portion and a pintle projecting from said plate portion to engage said bearing aperture; and pin means extending through said segment slots and said pintle to secure said boss against axial displacement from said pintle.

26. The apparatus recited in claim 25 wherein said pivot block includes side lug formations defining semi-cylindrical inner faces concentric with said pintle to envelope the side surfaces of said boss, said pin means extending also through said lug formations.

* * * * *